United States Patent [19]
Uenohara et al.

[11] Patent Number: 5,480,017
[45] Date of Patent: Jan. 2, 1996

[54] ANNULAR HYDRAULIC CLUTCH RELEASE CYLINDER DEVICE

[75] Inventors: Norihisa Uenohara; Hiroshi Uehara, both of Osaka, Japan

[73] Assignee: Exedy Corporation, Osaka, Japan

[21] Appl. No.: 227,924

[22] Filed: Apr. 15, 1994

[30] Foreign Application Priority Data

Sep. 14, 1993 [JP] Japan .................................. 5-252529
Sep. 14, 1993 [JP] Japan .................................. 5-252530
Sep. 14, 1993 [JP] Japan .................................. 5-252531

[51] Int. Cl.$^6$ ............................. F16D 23/14; F16D 25/06
[52] U.S. Cl. ........................... 192/98; 192/91 A; 92/107
[58] Field of Search ........................ 192/91 A, 85 CA, 192/98; 92/107, 130 R, 168

[56] References Cited

U.S. PATENT DOCUMENTS

| | | | |
|---|---|---|---|
| 4,456,111 | 6/1984 | Limbacher | 192/85 CA |
| 4,708,228 | 11/1987 | Leigh-Monstevens | 192/85 CA |
| 4,938,332 | 7/1990 | Thomas et al. | 192/85 CA |
| 4,960,193 | 10/1990 | Hodge | 192/91 A |
| 5,083,649 | 1/1992 | Baer | 192/98 |
| 5,113,991 | 5/1992 | Kajitani et al. | 192/98 |
| 5,267,637 | 12/1993 | Wilbur et al. | 192/85 CA |

*Primary Examiner*—Richard M. Lorence
*Attorney, Agent, or Firm*—Skjerven, Morrill, MacPherson, Franklin & Friel

[57] ABSTRACT

In a clutch release cylinder device, comprising an annular cylinder defining an annular recess, an annular piston slidably received in the annular recess; and an annular clutch release bearing assembly including a release bearing, the annular cylinder is constructed by a pair of cylinder members each formed by drawing sheet metal, and provided with a flange and a tubular portion, the tubular portion of one of the cylinder members being larger than that of the tubular portion of the other cylinder member, the annular recess being defined between the tubular portions which are coaxially nested with each other. Because the cylinder members may be made of metallic material, such as steel and other materials of high rigidity and mechanical strength, a sufficient rigidity and mechanical strength can be ensured with a substantially smaller wall thickness as compared to a cylinder formed by a molded plastic member, and substantially more economically as compared with a cylinder formed by machining a metallic block.

13 Claims, 9 Drawing Sheets

ANNULAR HYDRAULIC CLUTCH RELEASE CYLINDER DEVICE

TECHNICAL FIELD

The present invention relates to a hydraulic clutch release cylinder device, and in particular to a hydraulic clutch release cylinder device having an annular slave cylinder coaxially disposed around an input shaft of a transmission device and an annular piston received in this annular cylinder for directly actuating a release bearing.

BACKGROUND OF THE INVENTION

Conventionally, a slave cylinder of a clutch release mechanism is actuated by hydraulic pressure produced by a master cylinder connected to a clutch pedal. The slave cylinder in turn axially displaces a release bearing via a release fork to cause the release bearing to either push or pull a central part of a diaphragm spring of the clutch device, and a pressure plate is displaced away from a clutch disk.

With the increase in the maximum output of engines, there has been a strong demand for an ever greater capacity of the clutch device to allow the pressure of the pressure plate to be increased. As a result, the force required for releasing the clutch is increased, and it has become a major task to reduce the release force in designing a clutch release mechanism.

It is possible to reduce the force required for releasing the clutch by increasing the bore size of the slave cylinder, to use a booster making use of the negative pressure of the engine intake system, and to increase the lever length of the release fork. However, these measures require the overall size of the clutch device to be increased, and are not acceptable in all of the applications.

An alternative approach to solving this problem is the use of an annular slave cylinder disposed coaxially around an input shaft of a transmission device, and adopted to directly actuate a release bearing. A release cylinder device using such an annular cylinder, which is also known by the name of concentric slave cylinder (CSC) type release cylinder device, is proposed, for instance, in the U.S. Pat. No. 4,938,332. According to this proposal, a tubular piston is received in an annular recess in an axially slidable manner, and the hydraulic pressure is supplied to a bottom end of the annular recess. The use of a tubular piston allows the pressure receiving surface of the piston to be maximized for a given size of the clutch release cylinder device.

However, according to the CSC type release cylinder device, the inner surface of the annular recess must to finished at an extremely high precision for the tubular piston to be received in the annular cylinder in a liquid tight manner. Furthermore, a bottom end of the annular recess is provided with an inlet for hydraulic fluid and an air purge hole. Due to these factors, the annular cylinder is known to be expensive to manufacture.

BRIEF SUMMARY OF THE INVENTION

In view of such problems of the prior art, a primary object of the present invention is to provide a clutch release cylinder device which is compact in size and economical to manufacture.

A second object of the present invention is to provide a clutch release cylinder device which is reliable in use and economical to manufacture.

A third object of the present invention is to provide a clutch release cylinder device which can produce a large actuating force for a given hydraulic input.

According to the present invention, these and other objects can be accomplished by providing a clutch release cylinder device, comprising: an annular cylinder aligned coaxially with an axial center line of a clutch device, and defining an annular recess having an open end facing the clutch device and a closed bottom end facing away from the clutch device; an annular piston slidably received in the annular recess; and an annular clutch release bearing assembly including a release bearing, a bearing seat fixedly secured to an external axial end of the annular piston and supporting the release bearing, and a pressure flange supported by the release bearing and adapted to engage a central part of diaphragm spring means of the clutch device, the annular cylinder comprising a pair of cylinder members each formed by drawing or stamping sheet metal, and provided with a flange and a tubular portion, the tubular portion of one of the cylinder members being larger than that of the tubular portion of the other cylinder member, the annular recess being defined between the tubular portions which are coaxially nested with each other.

Thus, according to the present invention, the annular cylinder can be formed essentially by combining two cylinder members which can be formed by drawing sheet metal. The cylinder members may be made of metallic material, such as steel and other materials, having a high rigidity and mechanical strength, and can therefore ensure a sufficient rigidity and mechanical strength with a substantially smaller wall thickness as compared to a cylinder formed by a molded plastic member. It is known that the use of an annular cylinder and an annular piston allows the actuating force of the cylinder device to be evenly applied to the release bearing, and the produced axial actuating force can be efficiently transmitted to the release bearing.

Furthermore, the annular recess defined by the cylinder members to define the annular cylinder bore does not require any machining for most applications, and can yet provide a sufficient favorable and precise surface finish substantially more economically as compared to the case where the annular recess is formed by machining a metallic block. If desired, the inner surface of the annular recess can be finished to a desired precision by machining the corresponding surfaces of the cylinder members before they are combined into the cylinder device.

Because the device is formed by combining the two cylinder members, a passage leading to the bottom end of the annular recess can be easily and economically formed in a spacer member or the like which is to be interposed between the flanges of the cylinder members or in an interface between the two flanges of the cylinder members when the space member is omitted. The omission of the spacer member can reduce the overall axial length of the clutch release cylinder device.

According to a preferred embodiment of the present invention, a compression coil spring surrounds the annular cylinder, and is provided with a first end engaged with an external end of the annular piston, and a second end engaged by a base end of the cylinder, the compression coil spring urging the release bearing toward the central part of the diaphragm spring means of the clutch device. The compression coil spring may be provided with an additional function to prohibit rotation of the annular piston around its axial center line.

To ensure a high reliability of the clutch release cylinder device, it is desirable to use a flexible dust boot surrounding the annular cylinder and, if applicable, the compression coil spring, the dust cover having a first end connected to an external axial end of the annular piston and a second end connected to a base end of the annular cylinder.

The release bearing is preferably offset axially away from the clutch device to reduce the overall axial length of the clutch release cylinder device. The release bearing assembly may be surrounded by the annular piston so that the annular space between the input shaft and the inner circumferential surface of the cylinder may be conveniently utilized. Alternatively, the release bearing assembly may surround the annular piston so that the overall outer diameter of the clutch release cylinder device may be minimized.

For the convenience of manufacture and the reduction of weight, the annular piston member may be made of a molded plastic member, and if desired, the external axial end portion of the annular piston is integrally molded with the bearing seat.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1A:
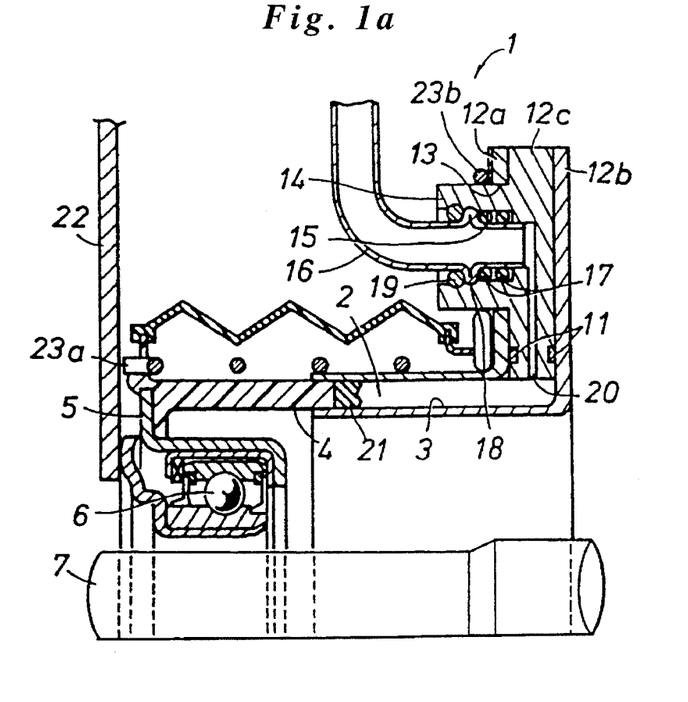
FIG. 1a is a sectional top half view of a first embodiment of the clutch release cylinder device according to the present invention showing the top half with a clutch device disengaged.
Figure 1B:
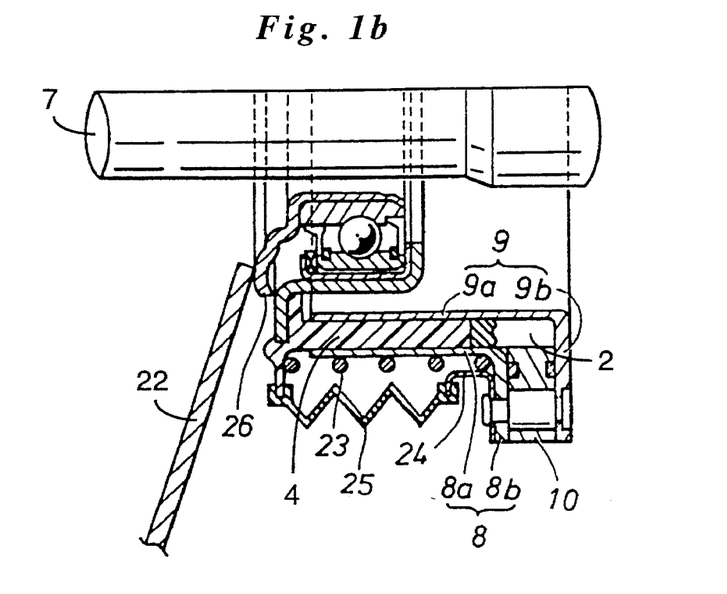
FIG. 1b is a sectional bottom half-view thereof showing the clutch device engaged.
Figure 2:
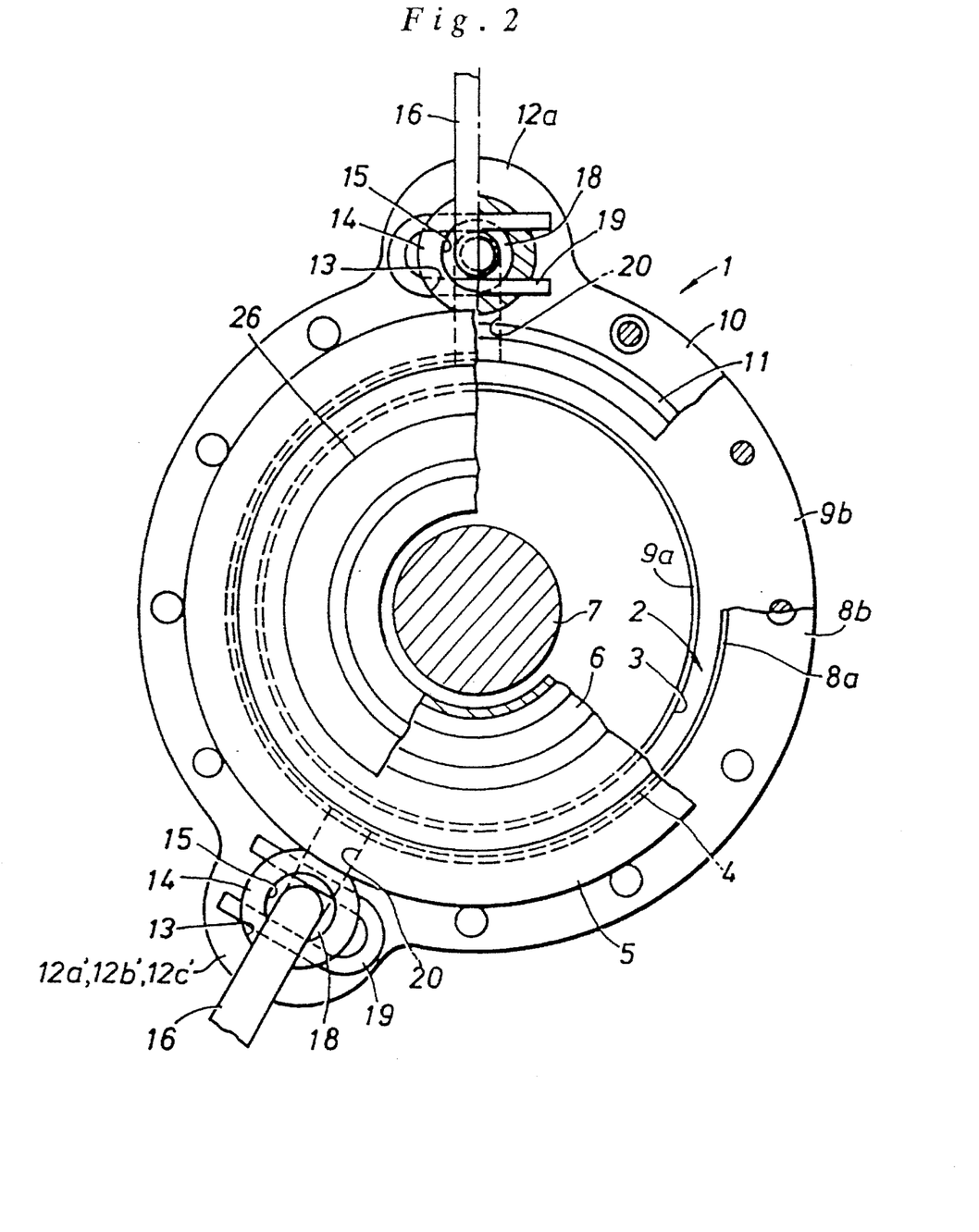
FIG. 2 is a front view of the first embodiment showing a part thereof in section.

FIGS. 1 and 2 show a first embodiment of the clutch release cylinder device according to the present invention, and the upper half of FIG. 1 corresponds to the state when the clutch is disengaged while the lower half of FIG. 1 corresponds to the state when the clutch is engaged. The same scheme is used in each of the sectional views appended to this application. This clutch release cylinder device 1 is disposed coaxially with an input shaft 7 of a transmission, and comprises an annular cylinder 2 fixedly secured to a transmission housing, an annular piston 4 slidably received in an annular recess 3 provided in the cylinder 2, and a release bearing 6 fixedly secured to an axially external end of the annular piston 4 via a bearing seat 5.

The cylinder 2 consists of a pair of similarly shaped cylinder members 8 and 9 each made by drawing sheet metal or otherwise forming sheet metal, and having a tubular portion 8a or 9a and a radial flange 8b or 9b extending radially outwardly from an axial end of the corresponding tubular portion 8a or 9a. The tubular portions 8a and 9a have diameters which are different from each other, and the radial flanges 8b and 9b have outer profiles which substantially conform to each other. Thus, by fitting one of the tubular portions 9a into the other tubular portion 8a, or by nesting one of them into the other, an annular recess 3 extending coaxially around and along the input shaft 7 is defined between the two tubular portions 8a and 9a of the cylinder members 8 and 9. An annular spacer member 10 is interposed between the radial flanges 8b and 9b, and by joining the peripheral parts of the two flanges 8b and 9b together with rivets with O-rings 11 placed in suitable locations, the cylinder members 8 and 9 are securely combined with each other, and the annular recess 3 is defined with a liquid tight bottom end.

As best shown in FIG. 2, the radial flanges 8b and 9b and the annular spacer member 10 are each provided with a pair of ear portions 12a and 12a', 12b and 12b', or 12c and 12c' extending radially from 150 degree apart positions of the corresponding member. The clutch release cylinder device is thus provided with two sets of such ear portions 12a, 12b and 12c, and 12a', 12b' and 12c', and each set of the ear portions is provided with a similar structure for connecting a conduit for introducing hydraulic fluid. For the operation of the clutch release cylinder device, a single hydraulic conduit is sufficient, but two hydraulic conduits are connected to the clutch release cylinder device for the convenience of purging air when assembling and servicing the device. For the convenience of description, only one of the conduits and the associated ear portion set are mentioned in the following description.

The ear portion 12a of the flange 8b is provided with a circular opening 13, and an annular projection 14 provided in the annular spacer member 10 is passed through this circular opening 13. The annular projection 14 is provided with an inner bore 15 serving as a hole for receiving an end of a hydraulic conduit 16 therein. The hydraulic conduit 16 is provided with a radial external flange 18 near its terminal end, and a pair of O-rings 17 are placed in a gap defined by the hydraulic conduit 16, the external flange 18, the inner bore 15, and an annular shoulder of the inner bore 15. A U-shaped clip 19 is passed into a pair of lateral holes passed through the annular projection 14, and the hydraulic conduit 16 is secured in the inner bore 15 with the flange 18 being engaged by the two leg portions of the U-shaped clip 19. The inner bore 15 is communicated with the inner circumferential surface of the annular spacer member 10 or, in other words, the bottom end of the annular recess 3 via a radial hydraulic passage 20 provided in the annular spacer member 10.

The annular piston 4 is provided with an annular seal member 21 on an axially inner end thereof to achieve a necessary liquid tight sealing for the annular piston 4. So that the release bearing 6 may be always in contact with the radially inner end of the diaphragm spring 22 whose position changes according to the degree of wear of a clutch facing not shown in the drawing, the annular piston 4 is always axially outwardly urged by a small spring force of a preload spring 23 consisting of a compression coil spring surrounding the cylinder 2. One end 23a of the preload spring is engaged by an external axial end of the annular piston 4, and the other end 23b of the preload spring is engaged by the annular projection 14 of the annular spacer member 10. The preload spring 23 thus additionally prevents the annular piston 4 from rotating around its axial line in use by virtue of the resistance imposed by the preload spring against a rotational displacement. An annular retainer 24 surrounding the preload spring 23 is fixedly secured to the flange 8b of one of the cylinder members 8, and a bellows-like dust boot 25 is placed around the preload spring 23 with one end of the dust boot 25 engaged by the retainer member 24 and the other end of the dust boot 25 engaged by the external end of the annular piston 4. In FIG. 2, the preload spring 23 and the dust boot 24 are omitted to avoid crowding the drawing.

The bearing seat 5 is substantially annular in shape, and is provided with a peripheral flange which is fixedly engaged by the external end of the annular piston 4, and an annular shoulder which is axially offset from the flange 5a toward the bottom end of the annular recess 3, and seats the outer race of the release bearing 6. A contact flange 26 is fixedly secured to the inner race of the release bearing 6, and its external radial extension abuts the radially inner end or the central part of the diaphragm spring 23. The release bearing 6 is provided with a self-aligning mechanism so that the contact flange 26 may always contact the diaphragm spring 22 evenly along its circumference.

Now the operation of the first embodiment is described in the following.

When the clutch pedal is not depressed, or when no hydraulic pressure is applied to the clutch release cylinder device, the release bearing 6 is at a first position displaced toward the transmission housing by the spring force of the diaphragm spring 22 (see the lower half of FIG. 1). In this condition, the pressure plate (not shown in the drawing) is pressing the clutch disk against the flywheel under the spring force of the diaphragm spring 22, and the power of the engine is transmitted to the transmission device.

When hydraulic pressure supplied from a master cylinder (not shown in the drawing) is introduced into the annular recess 3 via the hydraulic conduit 16 and the hydraulic passage 20 of the spacer member 10, the hydraulic pressure which has built up in the annular recess 3 pushes the annular piston 4 out of the annular recess 3. As a result, the bearing seat 5 fixedly secured to the annular piston 4, along with the release bearing 6, is pushed out, thereby releasing the pressure of the pressure plate on the clutch disk by pressing the central part of the diaphragm spring 22. This causes the clutch disk to be disengaged from the flywheel, and the transmission device is disconnected from the power output of the engine.

Figure 3A:
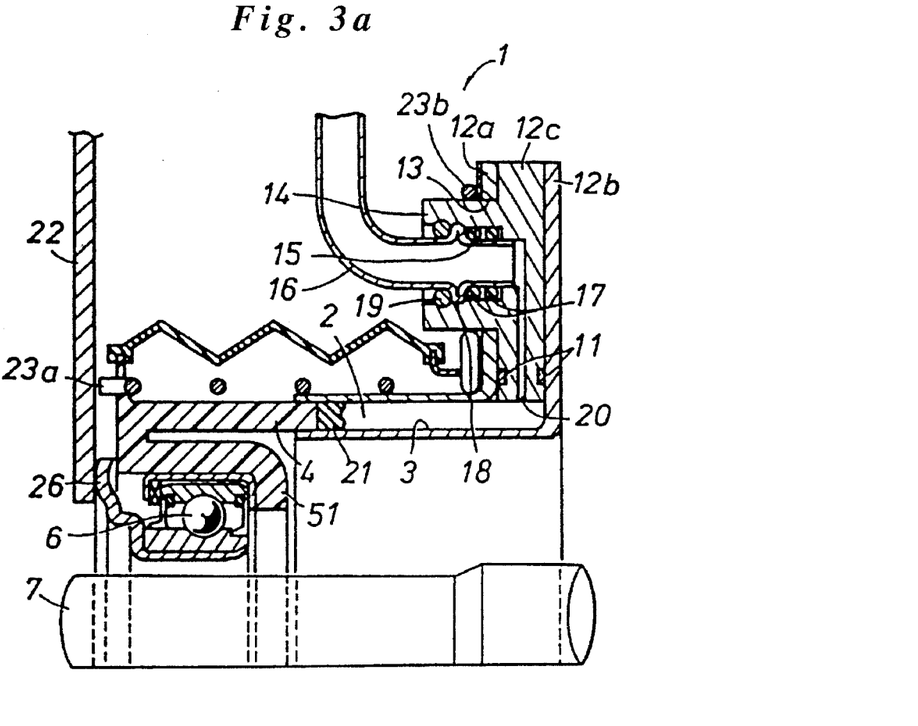
FIGS. 3a, 3b, 4a, 4b, 5a, 5b, 6a, and 6b are sectional views similar to FIG. 1a and 1b showing second through fifth embodiments of the present invention.
Figure 3B:
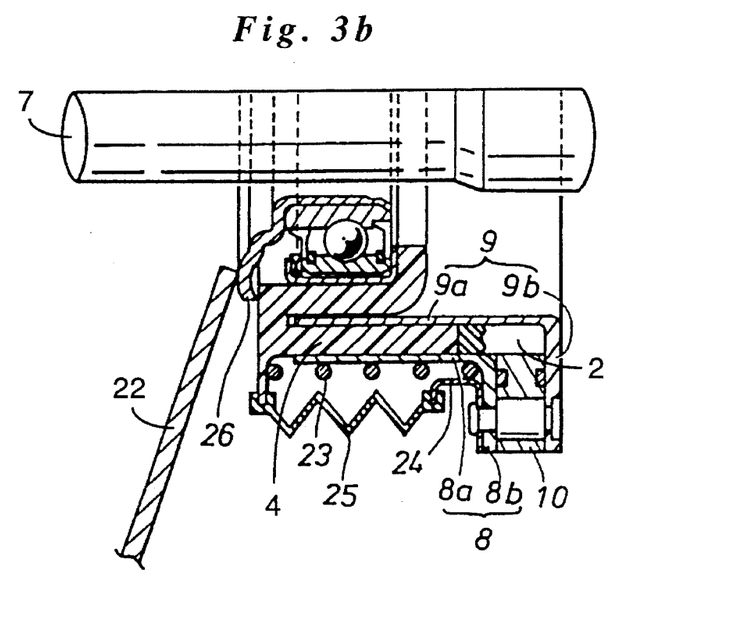

FIG. 3 shows a second embodiment of the present invention. The bearing seat 5 was made of drawn metallic plate, and fixedly secured to the external end of the annular piston 4 in the first embodiment. In the second embodiment, the bearing seat 51 is made of synthetic resin, and is integrally molded with the annular piston 4. This structure allows the number of component parts to be reduced, and the assembly process to be simplified. Other parts of this embodiment are similar to those of the first embodiment, and the description of such parts are not repeated here. In FIG. 3, such parts are denoted with like numerals.

Figure 4A:
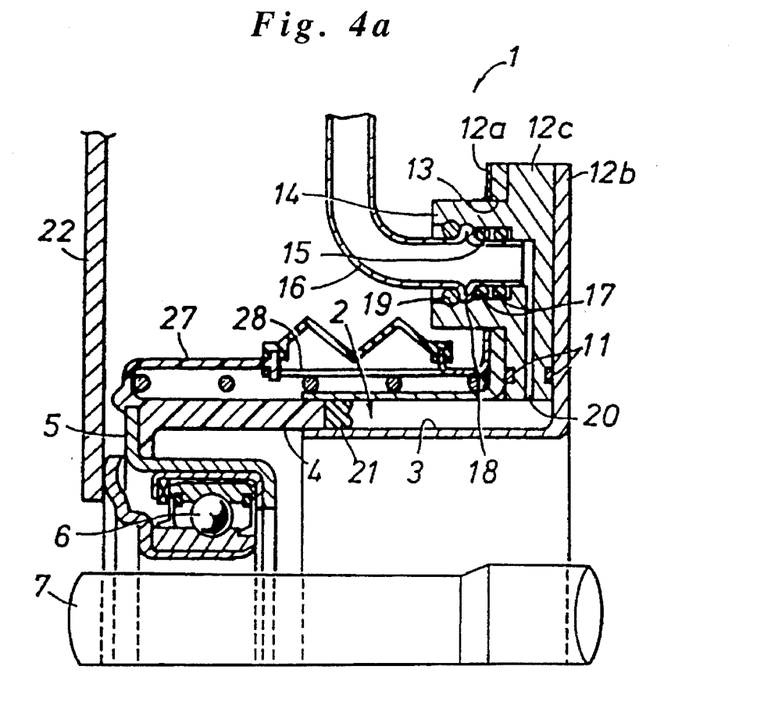
Figure 4B:
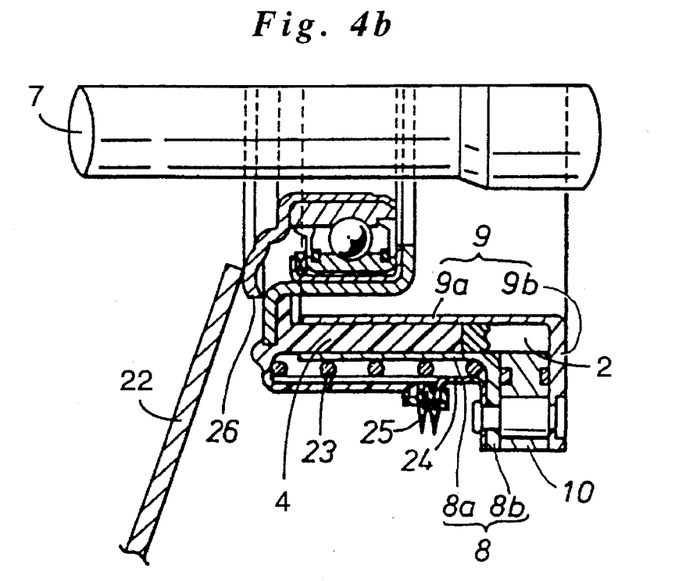

FIG. 4 shows a third embodiment of the present invention. The annular piston 4 was prevented from rotating around its axial center line by the torsional resistance of the preload spring 23 in the first and second embodiments. According to the third embodiment, a plurality of engagement portions 27 extending integrally from the external end of the annular piston 4 are received in associated axial slots provided in a guide member 28 extending from the retainer member 24 for engaging the dust boot 25. Thus, even though the preload spring 23 may slightly twist as it is compressed, the engagement between the engagement portions 27 and the slots of the guide member 28 can substantially completely eliminate the rotation of the annular piston 4 relative to the cylinder 2. Other parts of this embodiment are similar to those of the previously described embodiments, and the description of such parts are not repeated here. In FIG. 4, such parts are denoted with like numerals.

Figure 5A:
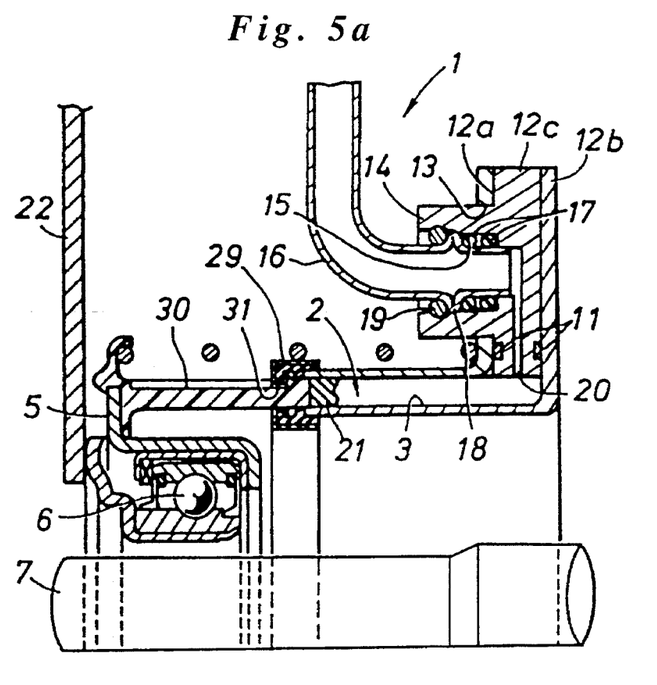
Figure 5B:
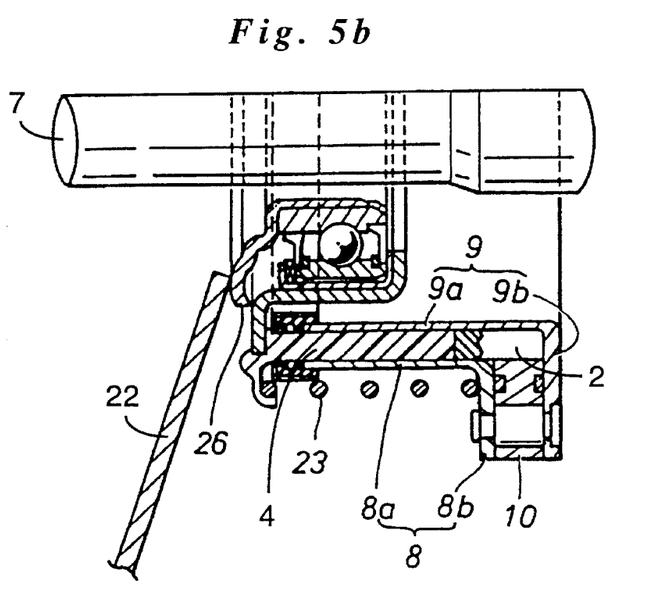

In the above described embodiments, the annular piston 4 was protected from the intrusion of dust and other foreign matters by mounting the flexible dust boot 25 between the external end of the annular piston 4 and the bottom end of the cylinder 2. According to a fourth embodiment of the present invention which is illustrated in FIG. 5, a dust seal 29 is provided around the open end of the annular recess 3. In this embodiment, the annular piston 4 is prevented from rotating around its axial center line by providing at least one axial slot 30 along the outer or inner circumferential surface of the annular piston 4, and a projection 31 provided in the dust seat 29 is received in this slot 30. Other parts of this embodiment are similar to those of the previously described embodiments, and the description of such parts are not repeated here. In FIG. 5, such parts are denoted with like numerals.

Figure 6A:
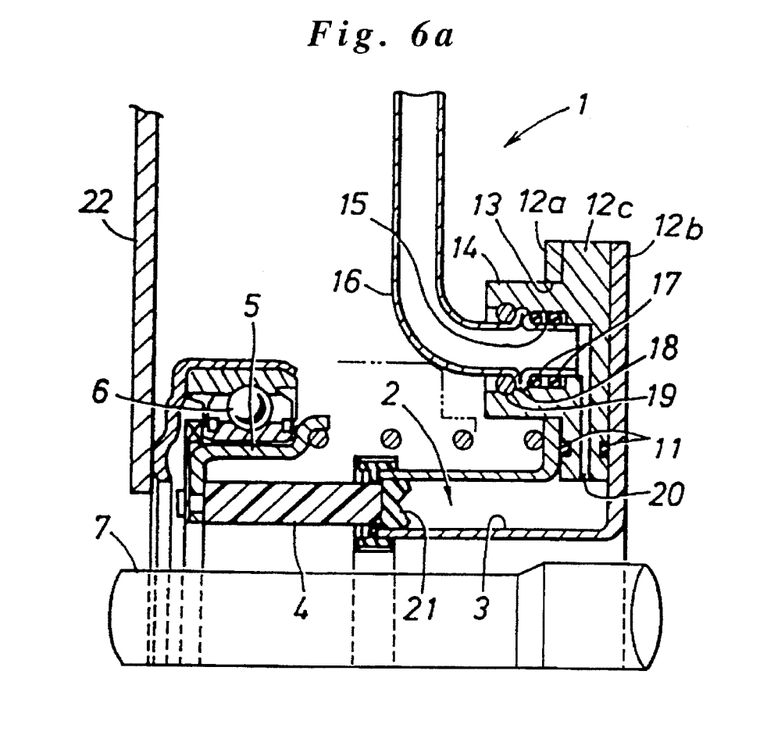
Figure 6B:
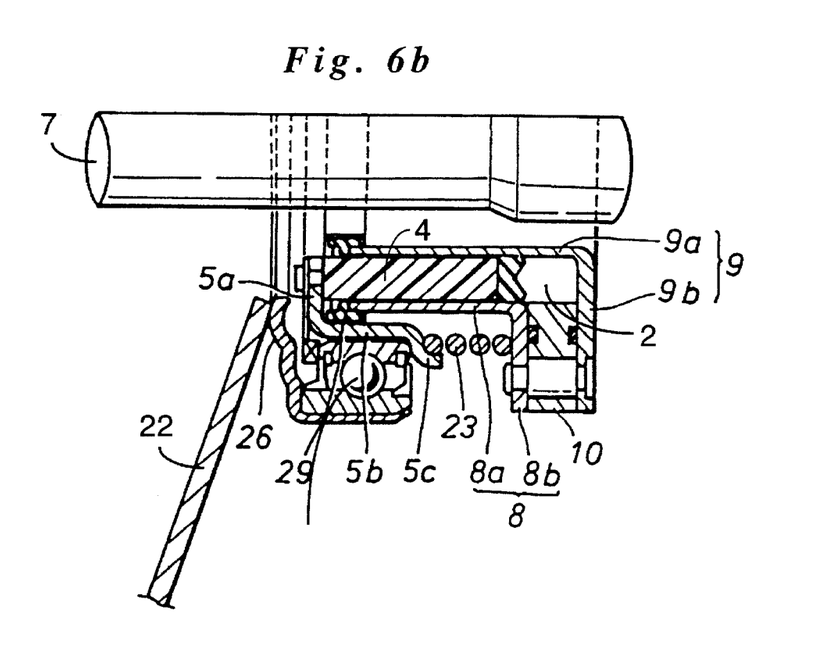
Figure 7:
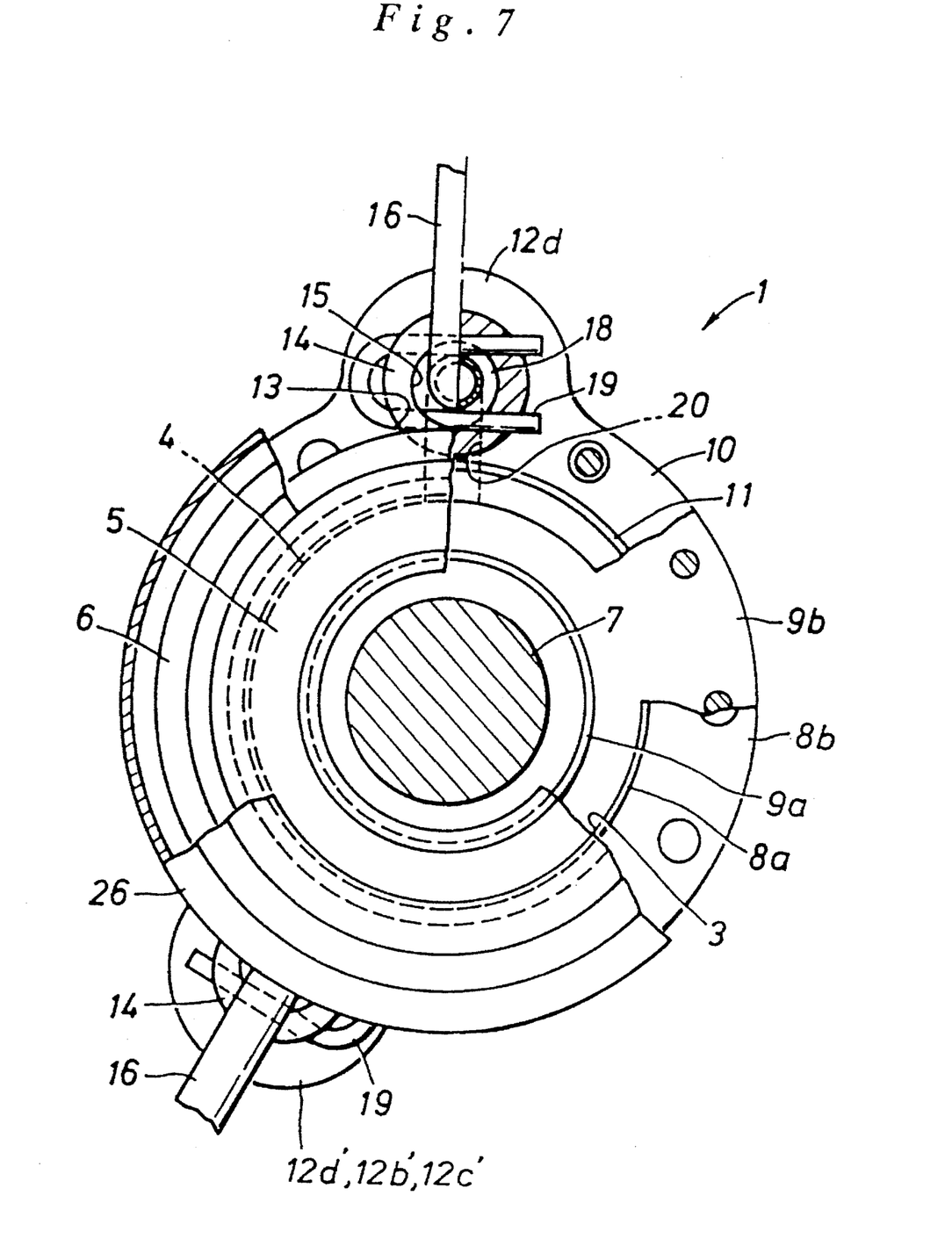
FIG. 7 is a view similar to FIG. 2 showing the fifth embodiment of the present invention.

FIGS. 6 and 7 show a fifth embodiment of the present invention. The assembly consisting of the bearing seat 5, the release bearing 6 and the contact flange 26 was disposed coaxially inside the annular space defined between the annular piston 4 and the input shaft 7. Therefore, the inner diameter of the cylinder 2 had to be dimensioned so as not to interfere with this assembly, and had to be made larger than desired depending on the application. According to the fifth embodiment illustrated in FIGS. 6 and 7, the assembly consisting of the bearing seat 5, the release bearing 6 and the contact flange 26 is disposed coaxially around the annular piston 4 and the annular cylinder 2, and is offset axially away from the clutch device. Thus, the outer profile of this assembly substantially conforms to the flanges 8b and 9b of the cylinder members 8 and 9, and the overall external profile of the clutch release cylinder device may be reduced as compared to the previously described embodiments. This embodiment is not provided with means for preventing the rotation of the annular piston 4, but is otherwise similar to the previously described embodiments. Therefore, the description of such parts are not repeated here, and, in FIGS. 6 and 7, such parts are denoted with like numerals.

Figure 8A:
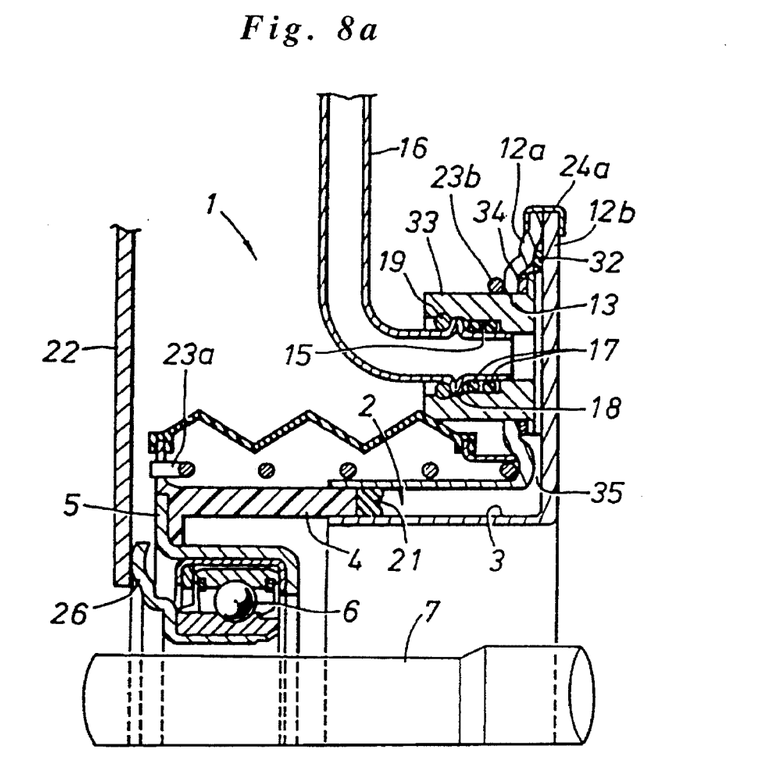
FIGS. 8a and 8b is a sectional views similar to FIGS. 1a and 1b showing a sixth embodiment of the present invention.
Figure 8B:
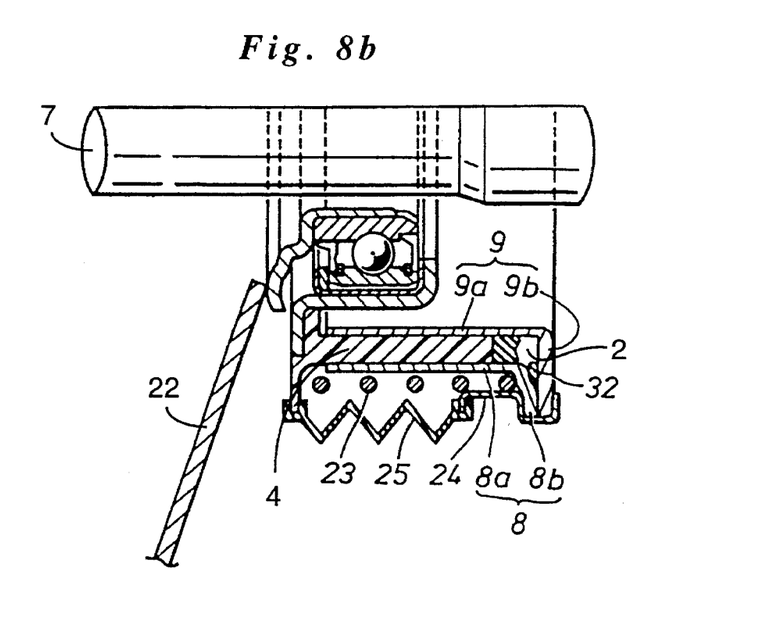
Figure 9:
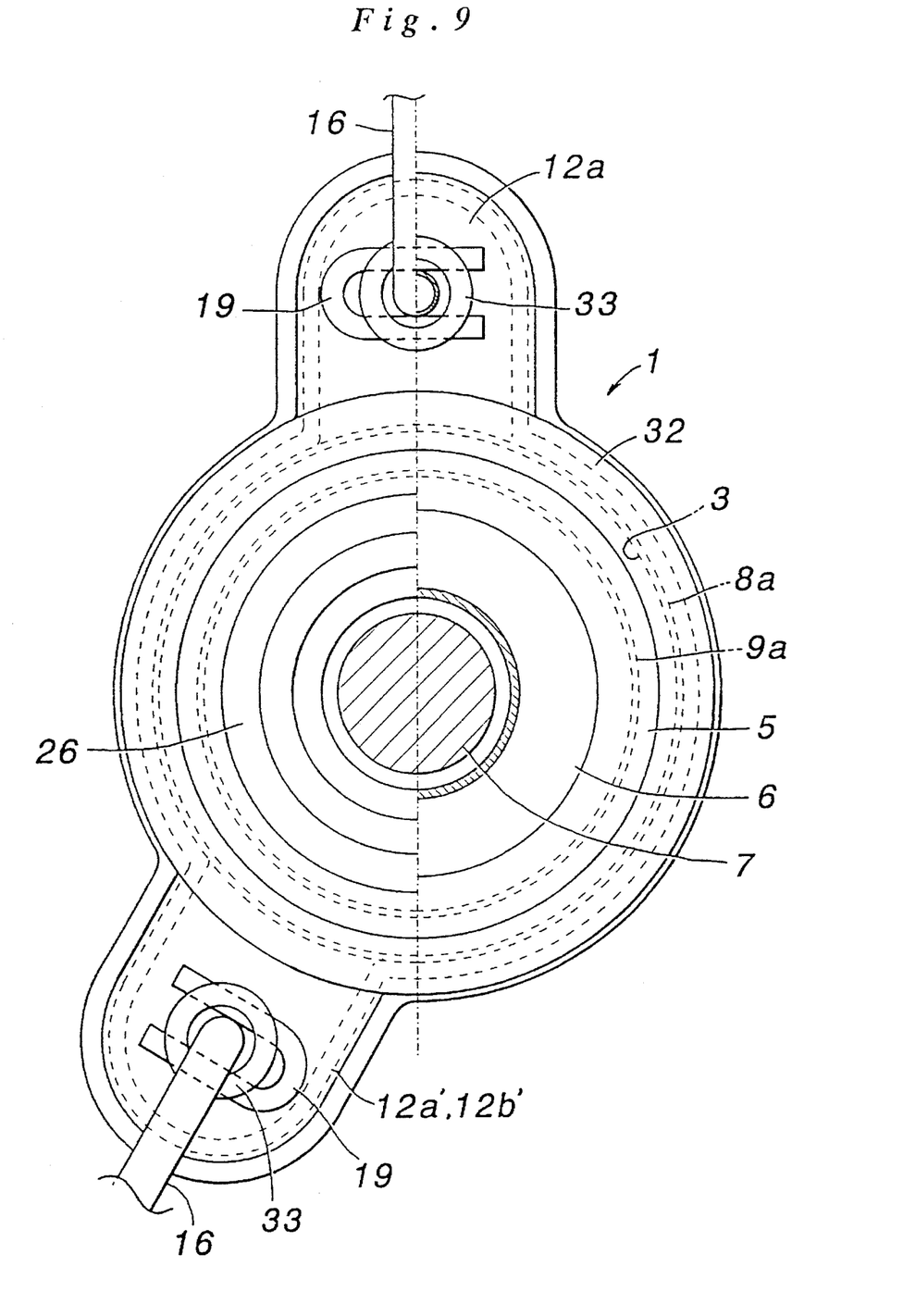
FIG. 9 a view similar to FIG. 2 showing the sixth embodiment of the present invention.

FIGS. 8 and 9 show a sixth embodiment of the present invention. In the previously described embodiments, the spacer member 10 was interposed between the flanges 8b and 9b of the cylinder members 8 and 9 for the purpose of providing the inlet end and the passage for the hydraulic fluid leading to the bottom end of the annular recess as well as to allow liquid-tight connection between the flanges 8b and 9b. According to the sixth embodiment illustrated in FIGS. 8 and 9, the spacer member 10 is omitted, and the two flanges 8b and 9b are joined together by crimping an extension 24a of the retaining member 24 onto the peripheral part of the flanges 8b and 9b. The necessary sealing of the peripheral part of the flanges 8b and 9b is provided by an O-ring 32 interposed between the peripheral parts of the flanges 8b and 9b.

The inlet end for the hydraulic fluid is provided by an inlet member 33 having a base flange and an annular projection extending from the base flange. The annular projection is passed through an opening 13 provided in the annular flange 8b, and the base flange is securely interposed between the two flanges 8b and 9b of the cylinder members 8 and 9. The necessary sealing of the inlet member 33 is provided by an O-ring 34 interposed between the base flange of the inlet member 33 and the part of the flange 8b of the cylinder member 8 surrounding the opening 13. Other parts of this embodiment are similar to those of the previously described embodiments, and the description of such parts are not repeated here. In FIGS. 8 and 9, such parts are denoted with like numerals.

Thus, according to the present invention, the annular cylinder can be formed essentially by combining two cylinder members which can be formed by drawing sheet metal. The cylinder members are made of metallic material, such as steel and other materials of high rigidity and mechanical strength, and can therefore ensure a sufficient rigidity and mechanical strength with a substantially smaller wall thickness as compared to a cylinder formed by a molded plastic member.

Furthermore, the annular recess defined by the cylinder members to define the annular cylinder bore does not require any machining for most applications, and can yet provide a sufficient favorable and precise surface finish substantially more economically as compared to the case where the annular recess is formed by machining a metallic block. If desired, the inner surface of the annular recess can be finished to a desired precision by machining the corresponding surfaces of the cylinder members before they are combined into the cylinder device.

Because the device is formed by combining the two cylinder members, a passage leading to the bottom end of the annular recess can be easily and economically formed in a spacer member or the like which is to be interposed between the flanges of the cylinder members or in an interface between the two flanges of the cylinder members when the space member is omitted.

Although the present invention has been described in terms of specific embodiments, it is possible to modify and alter details thereof without departing from the spirit of the present invention.

What we claim is:

1. A clutch release cylinder device for use with a clutch, comprising:
   an annular cylinder adapted to be aligned coaxially with an axial center line of a clutch device, said release cylinder device defining an annular recess having an open end facing the clutch device and a closed bottom end facing away from the clutch device;
   an annular piston slidably received in said annular recess; and
   an annular clutch release bearing assembly including a release bearing a bearing seat fixedly secured to an external axial end of said annular piston and supporting said release bearing, and a pressure flange supported by said release bearing and adapted to engage a central part of a diaphragm spring means of the clutch device,
   said annular cylinder comprising a pair of cylinder members each formed of formed sheet metal, and provided with a flange and a tubular portion, said tubular portion of one of said cylinder members being larger than that of the tubular portion of the other cylinder member, said annular recess being defined between said tubular portions which are coaxially nested with each other; and
   wherein said annular cylinder further comprises an annular spacer member interposed between said flanges of said cylinder members, a passage leading to said bottom end of said annular recess being passed through said space member.

2. A clutch release cylinder device according to claim 1, wherein said annular spacer member is provided with an annular projection extending axially therefrom and passed through an opening provided in the flange of one of said cylinder members, and said annular projection being internally provided with an inlet passage leading to said bottom end of said annular recess via a passage passed through said spacer member.

3. A clutch release cylinder device according to claim 1, wherein a compression coil spring surrounds said annular cylinder, and is provided with a first end engaged with an external end of said annular piston, and a second end engaged by a base end of said annular cylinder, said compression coil spring adapted to urge said release bearing toward the central part of the diaphragm spring means of the clutch device.

4. A clutch release cylinder device according to claim 3, wherein said two ends of said compression coil spring are securely engaged with corresponding parts of said annular piston and said annular cylinder, respectively, so that said compression coil spring prohibits rotation of said annular piston around its axial center line.

5. A clutch release cylinder device according to claim 3, further comprising a flexible dust boot surrounding said annular cylinder and said compression coil spring, said dust cover having a first end connected to an external axial end of said annular piston and a second end connected to a base end of said annular cylinder.

6. A clutch release cylinder device according to claim 1, further comprising a flexible dust boot surrounding said annular cylinder, said dust cover having a first end connected to an external axial end of said annular piston and a second end connected to a base end of said annular cylinder.

7. A clutch release cylinder device according to claim 1, wherein said release bearing assembly is surrounded by said annular piston, and is axially offset away from the clutch device.

8. A clutch release cylinder device according to claim 1, wherein said release bearing assembly surrounds said annular piston, and is axially offset away from the clutch device.

9. A clutch release cylinder device according to claim 1, wherein said annular piston member is made of a molded plastic member.

10. A clutch release cylinder device according to claim 9, wherein an external axial end portion of said annular piston is integrally molded with said bearing seat.

11. A clutch release cylinder device according to claim 1, further comprising means for prohibiting rotation of said annular piston around its axial center line.

12. A clutch release cylinder device, comprising:
    an annular cylinder adapted to be aligned coaxially with an axial center line of a clutch device, said release cylinder device defining an annular recess having an open end facing the clutch device and a closed bottom end facing away from the clutch device;
    an annular piston slidably received in said annular recess; and
    an annular clutch release bearing assembly including a release bearing a bearing seat fixedly secured to an external axial end of said annular piston and supporting said release bearing, and a pressure flange supported by said release bearing and adapted to engage a central part of a diaphragm spring means of the clutch device.
    said annular cylinder comprising a pair of cylinder members each formed of formed steel sheet metal, and provided with a flange and a tubular portion, said tubular portion of one of said cylinder members being larger than that of the tubular portion of the other cylinder member, said annular recess being defined between said tubular portions which are coaxially nested with each other; and wherein said flanges are joined together substantially directly with each other, and a passage leading to said bottom end of said annular recess is defined in an interface between the two flanges of said cylinder members.

13. A clutch release cylinder device according to claim 12, further comprising an inlet member comprising a base flange and an annular projection, said base flange being interposed between the two flanges of said cylinder members, said annular projection being passed through an opening provided in the flange of one of said cylinder members, and provided with an inner bore communicating with said passage leading to said bottom end of said annular recess.

* * * * *